United States Patent
Takeuchi

(10) Patent No.: US 9,128,318 B2
(45) Date of Patent: Sep. 8, 2015

(54) DISPLAY DEVICE

(71) Applicant: SONY CORPORATION, Tokyo (JP)

(72) Inventor: Hisakazu Takeuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/326,715

(22) Filed: Jul. 9, 2014

(65) Prior Publication Data

US 2014/0320780 A1    Oct. 30, 2014

Related U.S. Application Data

(63) Continuation of application No. 13/365,444, filed on Feb. 3, 2012, now Pat. No. 8,804,064.

(30) Foreign Application Priority Data

Feb. 10, 2011   (JP) .................. 2011-027295

(51) Int. Cl.
   *G02F 1/1333*   (2006.01)
   *H04N 5/64*   (2006.01)

(52) U.S. Cl.
   CPC ............ *G02F 1/133308* (2013.01); *H04N 5/64* (2013.01); *G02F 2001/13332* (2013.01); *G02F 2001/133314* (2013.01); *G02F 2001/133328* (2013.01); *G02F 2001/133331* (2013.01); *G02F 2202/28* (2013.01)

(58) Field of Classification Search
   None
   See application file for complete search history.

(56) References Cited

U.S. PATENT DOCUMENTS

2005/0285991 A1 *   12/2005   Yamazaki ...................... 349/58

* cited by examiner

*Primary Examiner* — Wen-Ying P Chen
(74) *Attorney, Agent, or Firm* — Sony Corporation

(57) ABSTRACT

There is provided a display device in which the thickness of a transparent board and an attaching member is reduced while the strength thereof is ensured. The display device includes a display panel, a transparent board having a panel installation region in which the display panel is provided, and an outer frame region surrounding the panel installation region, and an attaching member having a fixing portion bonded to the transparent board in the outer frame region, and an outer-side raised portion raised from a side of the fixing portion, the side being adjacent to an outline of the transparent board.

20 Claims, 20 Drawing Sheets

DISPLAY DEVICE

This application is a continuation of U.S. patent application Ser. No. 13/365,444 filed on Feb. 3, 2012, which claims priority from Japanese Patent Application JP 2011-027295 filed in the Japan Patent Office on Feb. 10, 2011. Each of the above referenced applications is hereby incorporated by reference in its entirety.

BACKGROUND

The present disclosure relates to a display device which is well suited to use as a flat-screen television apparatus and the like.

In recent years, display devices for various kinds of broadcast waves, video footage and the like are increasingly becoming larger and thinner, and a need exists for a configuration in which a video display region is widened, and a region outside of a display region (frame region) is narrowed, and the thickness of a housing is reduced. For the flat display devices as described above, a configuration is proposed in which a transparent board made of glass or the like is provided on the front face of a display panel to ensure the strength of the display panel (see, for example, Japanese Unexamined Patent Application Publication No 2005-70661). On the reverse face of the transparent board, a bracket member (attaching member) configured of a metal plate is provided in a frame shape, and the bracket member is used to attach the display panel to the transparent board.

SUMMARY

In order to further reduce the thickness of the display device described above, it has been desired to reduce the thickness of a transparent board and an attaching member while ensuring the strength thereof.

It is desirable to provide a display device in which the thickness of a transparent board and an attaching member is reduced while the strength thereof is ensured.

The display device according to an embodiment of the present disclosure includes the following constituent elements (A) to (C):

(A) a display panel;

(B) a transparent board having a panel installation region in which the display panel is provided, and an outer frame region surrounding the panel installation region; and (C) an attaching member having a fixing portion bonded to the transparent board in the outer frame region, and an outer-side raised portion raised from a side, of the fixing portion, adjacent to an outline of the transparent board.

In the display device according to the embodiment of the present disclosure, since the attaching member has the outer-side raised portion on a side, of the fixing portion, adjacent to the outline of the transparent board, the strength of the transparent board and the attaching member may be ensured, even when the thickness thereof is reduced.

With the display device according to the embodiment of the present disclosure, since the attaching member has the outer-side raised portion raised from a side, of the fixing portion, adjacent to the outline of the transparent board, the thickness of the transparent board and the attaching member may be reduced while ensuring the strength thereof.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Embodiments of the present disclosure will be specifically described below with reference to the drawings. The description will be made in the following order:
1. First Embodiment (an example in which attaching members extend to a corner region beyond a longitudinal outer frame region or a horizontal outer frame region)
2. Modification 1 (an example in which a raised portion is provided on an end of a horizontal attaching member in the corner region)
3. Second Embodiment (an example in which a boundary line between a vertical attaching member and the horizontal attaching member is bent in the corner region)
4. Modifications 2 and 3 (other examples in which the boundary line between the vertical attaching member and the horizontal attaching member is bent in the corner region)
5. Modifications 4 and 5 (examples in which the boundary line between the vertical attaching member and the horizontal attaching member is bent in the corner region, and at least a part of the boundary line is slanted relative to a vertical side or a horizontal side of the display panel)
6. Modifications 6 and 7 (examples in which at least a part of the boundary line between the vertical attaching member and the horizontal attaching member in the corner region is slanted relative to the vertical side or the horizontal side of the display panel)
7. Third embodiment (an example in which the joint member fixed to both of the vertical attaching member and the horizontal attaching member is provided on the corner of the transparent board)
8. Modification 8 (an example in which the cross section along the width direction of the attaching member corresponds to three sides of a rectangular shape)
9. Modification 9 (an example in which the cross section along the width direction of the attaching member has a rectangular shape)
10. Modification 10 (an example in which the exterior member serves also as the attaching member)
11. Modifications 11 to 13 (examples in which the attaching member is made of a resin)

The First Embodiment

Figure 1:
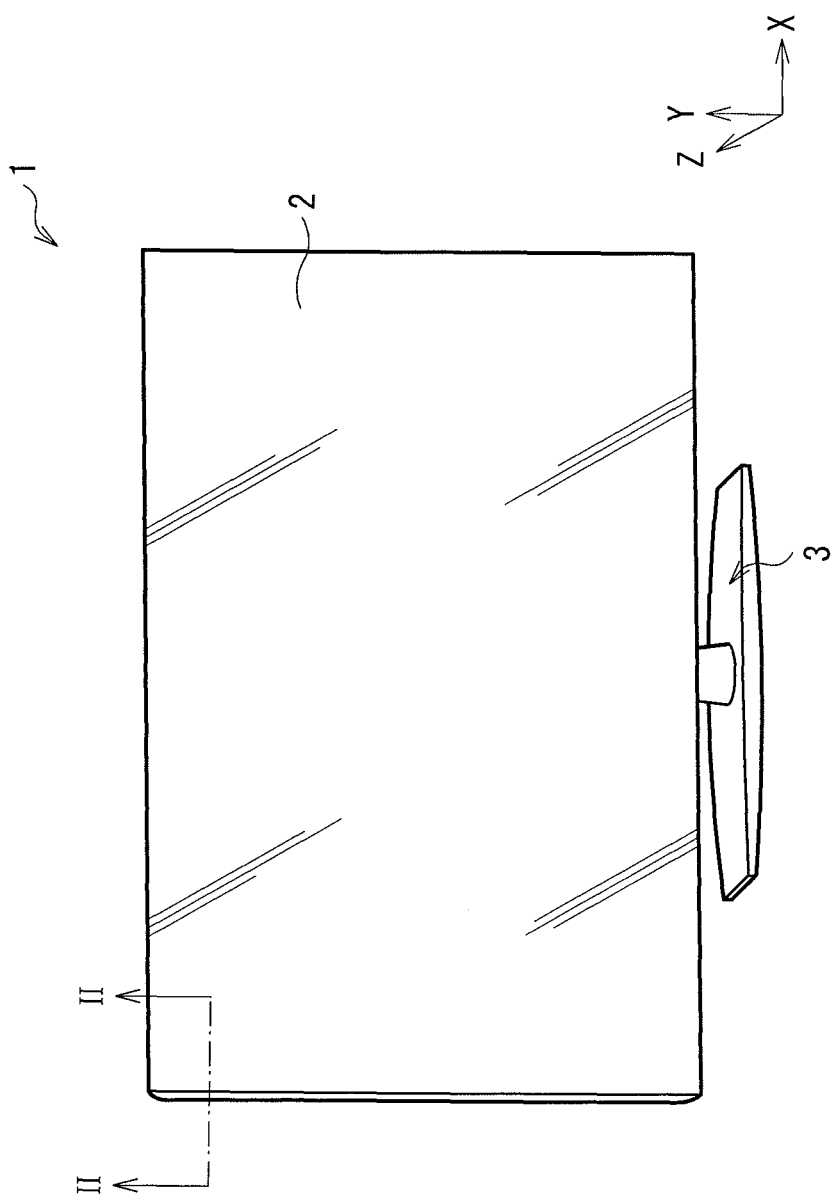
FIG. 1 is a perspective view illustrating an external appearance of a display device according to an embodiment of the present disclosure.

FIG. 1 illustrates an external appearance of a display device 1 according to an embodiment of the present disclosure. The display device 1 is used as, for example, a flat-screen television apparatus, and has a configuration in which a main body portion 2 having a plate shape for displaying an image is supported by a stand 3. It is to be noted that, although the display device 1 is used as a standing type which is mounted on a horizontal plane such as a floor, a shelf, or a table with the stand 3 attached to the main body portion 2, the display device 1 may be used as a wall-hanging type in a state where the stand 3 is dismounted from the main body portion 2.

Figure 2:
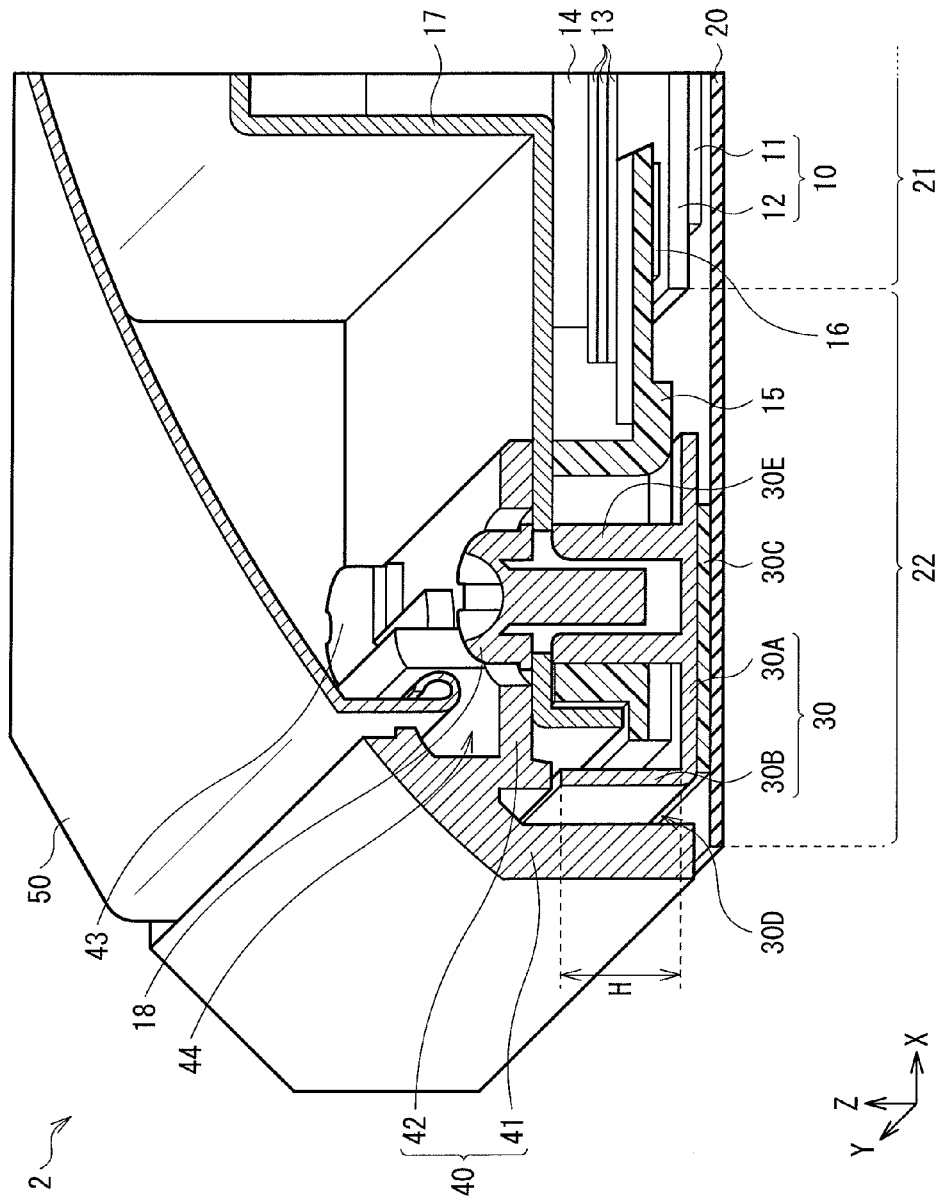
FIG. 2 is a partially cut-out perspective view illustrating an internal constitution of the main body portion shown in FIG. 1.

FIG. 2 is a partially cut-out perspective view illustrating an internal constitution of the main body portion shown in FIG. 1. The main body portion 2 has a transparent board 20 on a front face of a display panel 10. On the transparent board 20, an attaching member 30 and an exterior member 40 are provided around the display panel 10. The back face of the display panel 10 is covered by a back face cover (rear cover) 50. It is to be noted that, in FIG. 2 and subsequent figures, the direction perpendicular to the back face of the transparent board 20 is represented by z direction (front-back direction), and the horizontal direction of the transparent board 20 is represented by x direction, and the vertical direction of the transparent board 20 is represented by y direction.

The display panel 10 is a liquid crystal display panel having a drive substrate (so-called TFT substrate) 11 provided with a drive circuit and the like, and a liquid crystal layer (not shown) provided between the display panel 10 and an opposed substrate 12, for example. The display panel 10 is bonded to the transparent board 20 by a transparent bonding layer (not shown) made of an ultraviolet curable resin, and it is possible for the user to view a video displayed on the display panel 10 through the transparent board 20 and the bonding layer (not shown).

On the backside of the display panel 10, an optical sheet 13, a light guide plate 14, and a backlight (not shown) are disposed. The optical sheet 13 and the light guide plate 14 are held by a middle chassis 15 made of a resin material. The middle chassis 15 is fixed to the display panel 10 by a bonding layer 16. The display panel 10, the optical sheet 13, the light guide plate 14, the backlight, and the middle chassis 15 are covered by a back chassis 17 configured of a metal material such as a steel plate or a sheet-metal made of aluminum (Al) or magnesium (Mg).

The transparent board 20 has a thickness of, for example, 0.7 mm, and is configured of a plate glass, a resin plate, or the like. The transparent board 20 has a panel installation region 21 in which the display panel 10 is provided, and an outer frame region 22 other than the panel installation region 21.

The attaching member 30 is a component for fixing, to the transparent board 20, the exterior member 40, the back face cover 50, the middle chassis 15, and the back chassis 17, has a thickness of 0.8 mm for example, and is configured of a sheet-metal made of iron (Fe) or the like. The attaching member 30 has, along the width direction, an L-shaped cross section made up of a fixing portion 30A and an outer-side raised portion 30B. The fixing portion 30A is bonded to an outer frame region 22 of the transparent board 20 by a bonding layer 30C such as a double-face stick tape and the like. The outer-side raised portion 30B is raised from a side, of the fixing portion 30A, adjacent to an outline 20A of the transparent board 20, that is, from a side 30D located on the outer side in the width direction. Thus, in this display device, the thickness of the transparent board 20 and the attaching member 30 may be reduced while the strength thereof is ensured.

It is to be noted that, in FIG. 2, the fixing portion 30A of the attaching member 30 is provided with a stud 30E by which the back chassis 17 is fixed with a screw 18.

The strength of the attaching member 30 has little relationship with a width of fixing portion 30A, and is determined by a height H of the outer-side raised portion 30B. A height H of the outer-side raised portion 30B necessary for ensuring the strength is determined by the property of the material of the attaching member 30. For example, in the case where the transparent board 20 has the thickness of 0.7 mm and the attaching member 30 is made of iron (Fe), the height H of the outer-side raised portion 30B need only be 5 mm or more.

Figure 3:
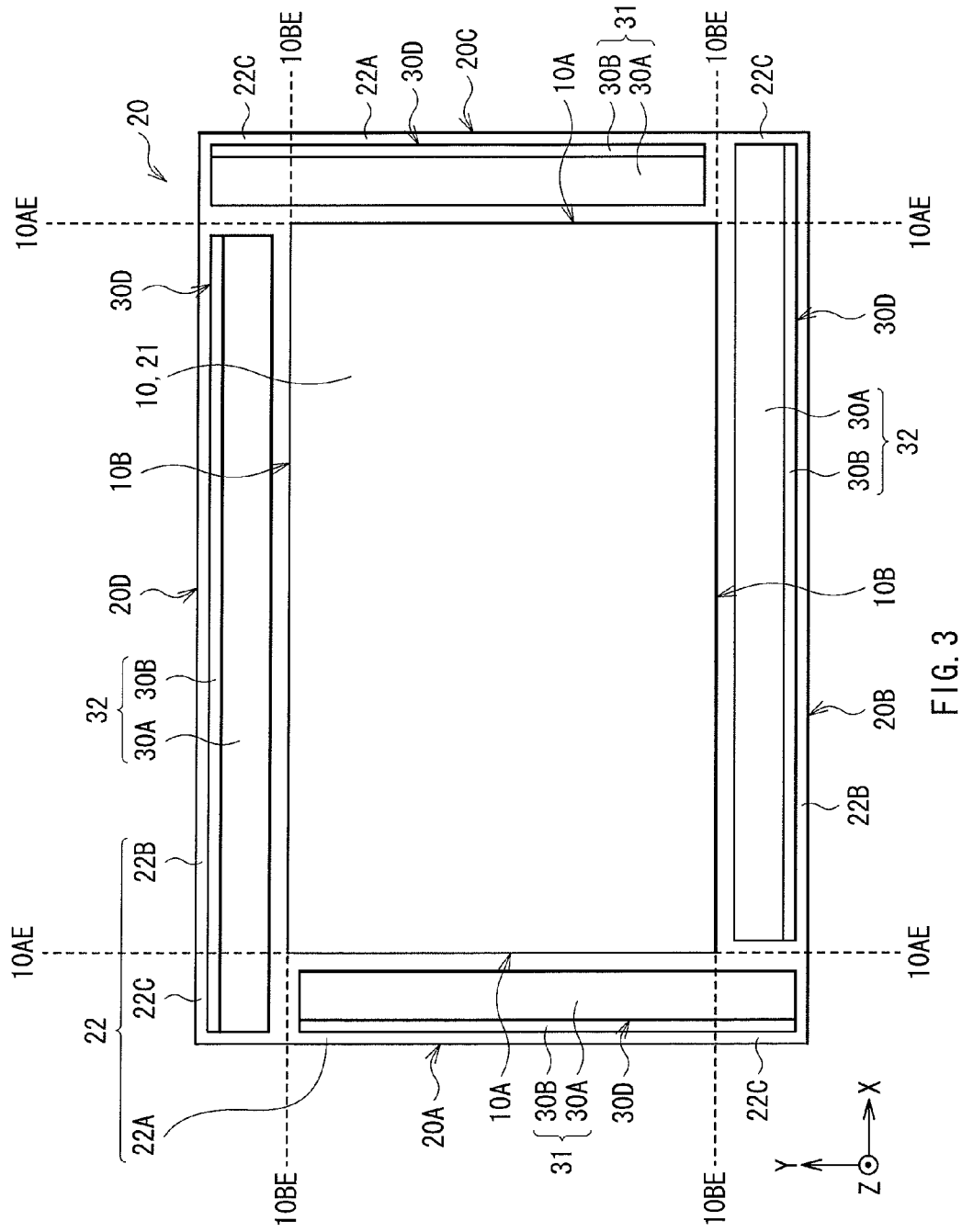
FIG. 3 is a plan view illustrating a layout of the transparent board and an attaching member shown in FIG. 2.
Figure 4:
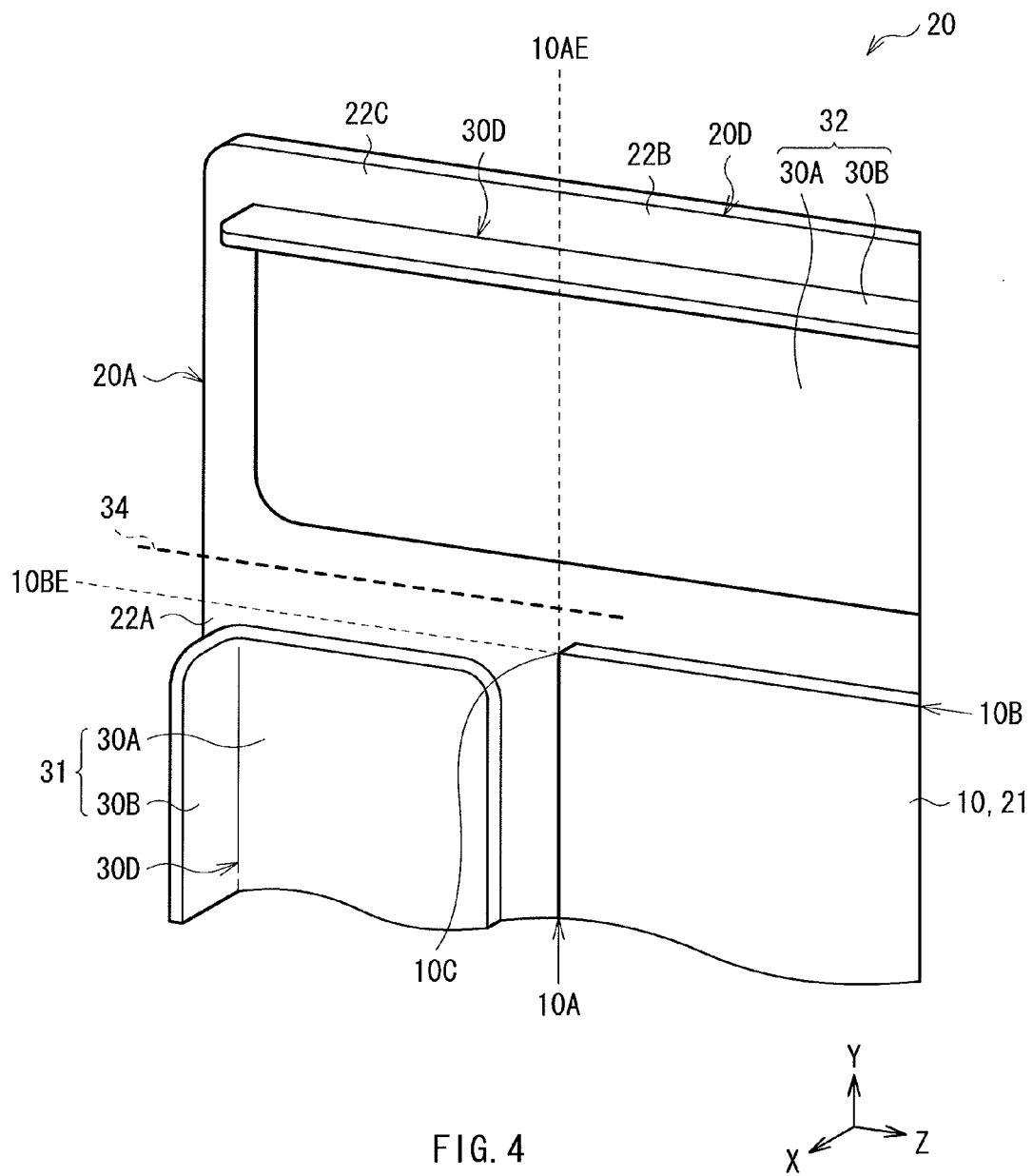
FIG. 4 is a perspective view illustrating a part of FIG. 3 in an enlarged manner.

FIG. 3 illustrates a layout of the display panel 10 and the attaching member 30 on the transparent board 20, and FIG. 4 illustrates a part of FIG. 3 in an enlarged manner. The transparent board 20 has a rectangular shape having outlines 20A, 20B, 20C, and 20D, for example. A panel installation region 21 is provided at substantially the center of the transparent board 20. The outer frame region 22 is a region surrounding the panel installation region 21 and having a frame-like rectangular shape. The outer frame region 22 has a pair of longitudinal outer frame regions 22A, a pair of horizontal outer frame regions 22B, and corner regions 22C provided at four corners. The longitudinal outer frame region 22A is a region having a vertically-long rectangular shape surrounded by a vertical side 10A of the display panel 10, extended lines 10BE of horizontal sides 10B of the display panel 10, and one of the outlines 20A and 20C of the transparent board 20. The horizontal outer frame region 22B is a region having a horizontally-long rectangular shape surrounded by a horizontal side 10B of the display panel 10, extended lines 10AE of the vertical sides 10A of the display panel 10, and one of the outlines 20B and 20D of the transparent board 20. Each of the corner regions 22C is a rectangular region surrounded by the extended line 10AE of the vertical side 10A of the display panel 10, the extended line 10BE of the horizontal side 10B of the display panel 10, and respective two of the outlines 20A to 20D of the transparent board 20.

The attaching member 30 has vertical attaching members 31 and horizontal attaching members 32. The vertical attaching member 31 is provided in the longitudinal outer frame region 22A, and the horizontal attaching member 32 is provided in the horizontal outer frame region 22B. Preferably, each of the vertical attaching member 31 and the horizontal attaching member 32 extends, beyond the longitudinal outer frame region 22A or the horizontal outer frame region 22B, to the corner region 22C. In this way, the outer-side raised portions 30B may extend to the vicinity of the respective outlines 20A to 20D of the transparent board 20, and it is possible to further enhance the effect of reducing the thickness of the transparent board 20 and the attaching member 30 while ensuring the strength thereof. It is to be noted that, although FIG. 3 illustrates the case where the vertical attaching member 31 and the horizontal attaching member 32 alternately extend to the corner regions 22C, it is possible to extend only the vertical attaching member 31 to the corner regions 22C. Alternatively, it is possible to extend only the horizontal attaching member 32 to the corner regions 22C.

The exterior member 40 shown in FIG. 2 is a member having a frame shape, which covers the side faces of the display panel 10 and made of, for example, aluminum (Al) or an alloy thereof. The exterior member 40 is provided outside the attaching member 30, and has a side face portion 41 parallel to the outer-side raised portion 30B of the attaching member 30, and a top face portion 42 perpendicular to the side face portion 41. The top face portion 42 is fixed to the attaching member 30 with a screw 43. On the top face portion 42, a recessed portion 44 is provided into which an end portion of the back face cover 50 is embedded.

The back face cover 50 shown in FIG. 2 is placed on the back face side of the display panel 10, and made of a metal such as iron (Fe). Alternatively, the back face cover 50 may be made of a resin material such as ABS resin (acrylonitrile-butadiene-styrene resin), PS (polystyrene), PC resin (polycarbonate resin) mixed with ABS resin, and PS mixed with PPE (polyphenylene ether).

For example, the display device 1 may be manufactured in the following manner.

Firstly, the transparent board 20 and the attaching member 30 having the configuration as described above are prepared, and the fixing portion 30A of the attaching member 30 is bonded to the outer frame region 22 of the transparent board 20 by the bonding layer 30C.

In addition, the display panel 10 with the above described configuration is prepared, and the entirety of the display panel 10 is bonded to the panel installation region 21 of the transparent board 20 by the bonding layer (not shown). Next, within the frame of the attaching member 30 of the transparent board 20, the optical sheet 13, the light guide plate 14, the backlight (not shown), the middle chassis 15 and the back chassis 17 are disposed, and the back chassis 17 is fixed to the attaching member 30 with a screw.

Thereafter, the exterior member 40 is disposed on the outside of the attaching member 30, and the top face portion 42 of the exterior member 40 is fixed to the attaching member 30 with a screw. Lastly, the end portion of the back face cover 50 is embedded into the recessed portion 44 of the exterior member 40. Thus, the main body portion 2 illustrated in FIG. 2 is formed. The main body portion 2 is attached to the stand 3 to thereby complete the display device 1 illustrated in FIG. 1.

In the display device 1, light from the backlight (not shown) enters the display panel 10 through the light guide plate 14 and the optical sheet 13, and the light is modulated on a pixel by pixel basis by the liquid crystal layer of the display panel 10, to display the image.

Figure 5:
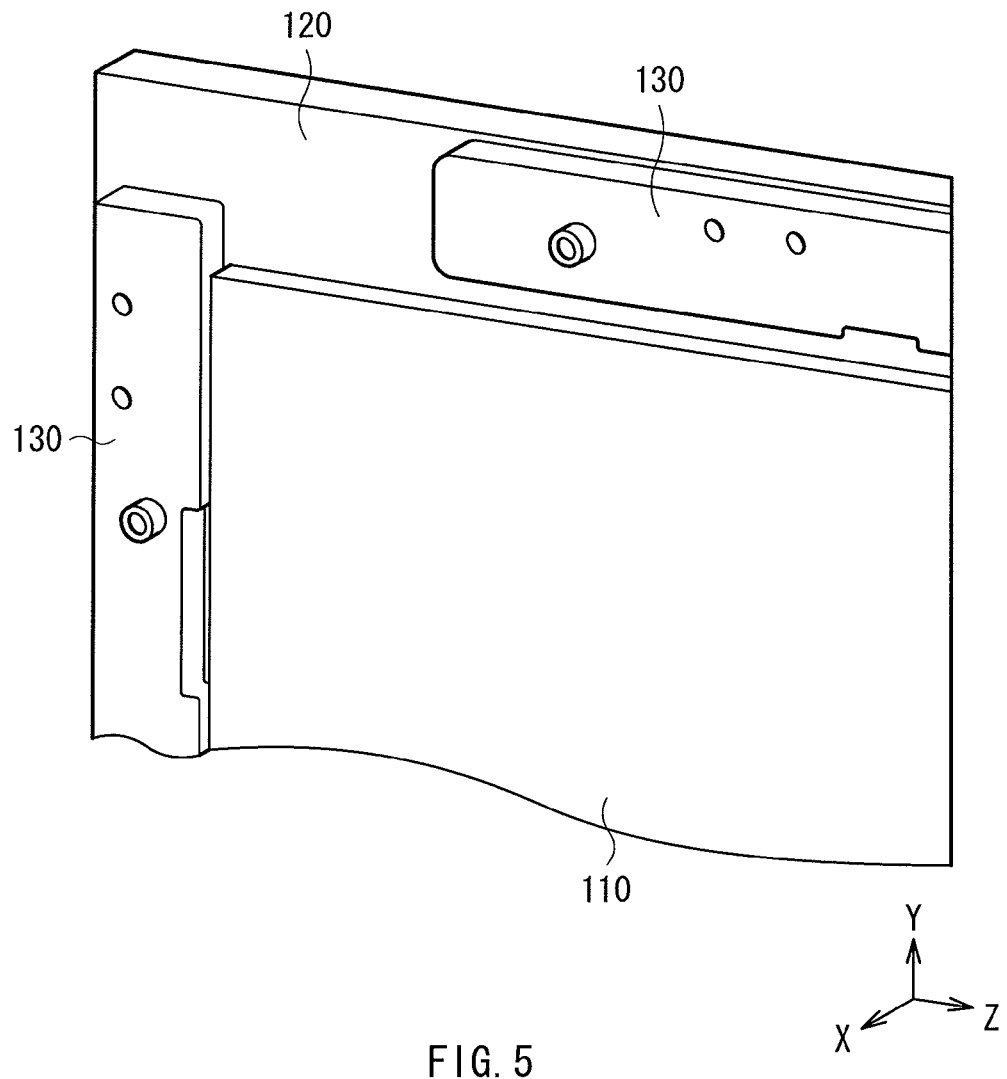
FIG. 5 is a perspective view illustrating a part of existing transparent board and attaching member in an enlarged manner.

In the related art, attaching members 130 each having a plate shape are provided on a transparent board 120, as illustrated in FIG. 5. The transparent board 120 has a thickness of, for example, 2.5 mm to 3.2 mm, and the attaching member 130 has a thickness of, for example, 1.2 mm, so that each of the transparent board 120 and the attaching member 130 has a sufficient strength independently. Therefore, it is only necessary for the attaching member 130 to have a minimum length required to attach the exterior member 40 or the like, and there is no necessity for the attaching member 130 to be extended to the corner of the transparent board 120.

However, in the case where the transparent board 120 is quite thin and has the thickness of, for example, 0.7 mm, it is necessary for the attaching member 130 having a plate shape illustrated in FIG. 5 to have the thickness of, for example, 2.0 mm or more. Additionally, in the case where the attaching member 130 is not extended to the corner of the transparent board 120, there is a possibility that the strength of the corner potion of the transparent board 120 is not sufficiently ensured.

In the present embodiment, each attaching member 30 has the outer-side raised portion 30B on the side, of the fixing portion 30A, adjacent to the respective outlines 20A to 20D of the transparent board 20 (side 30D located on the outer side in width direction), and has an L-shaped cross section along the width direction. This ensures the strength of the attaching member 30 even if the thickness is reduced to, for example, 0.8 mm. Besides, it becomes possible to reduce the thickness relative to the existing attaching member 130 illustrated in FIG. 5, which is highly advantageous in reducing the thickness of the display device 1 and cost. It is to be noted that, it has been found from the result of structural calculation that the attaching member 30 of the present embodiment ensures the sufficient strength when the main body portion 2 has a diagonal length of 65 inch or less.

As described above, since in the present embodiment, the each attaching member 30 has the outer-side raised portion 30B raised from the side, of the fixing portion 30A, adjacent to the respective outlines 20A to 20D of the transparent board 20 (side 30D located on the outer side in width direction), the thickness of the transparent board 20 and the attaching member 30 may be reduced while ensuring the strength thereof. Therefore, it becomes possible to reduce the thickness and the weight of the main body portion 2 and reduce the cost, improving the design.

Modification 1

Figure 6:
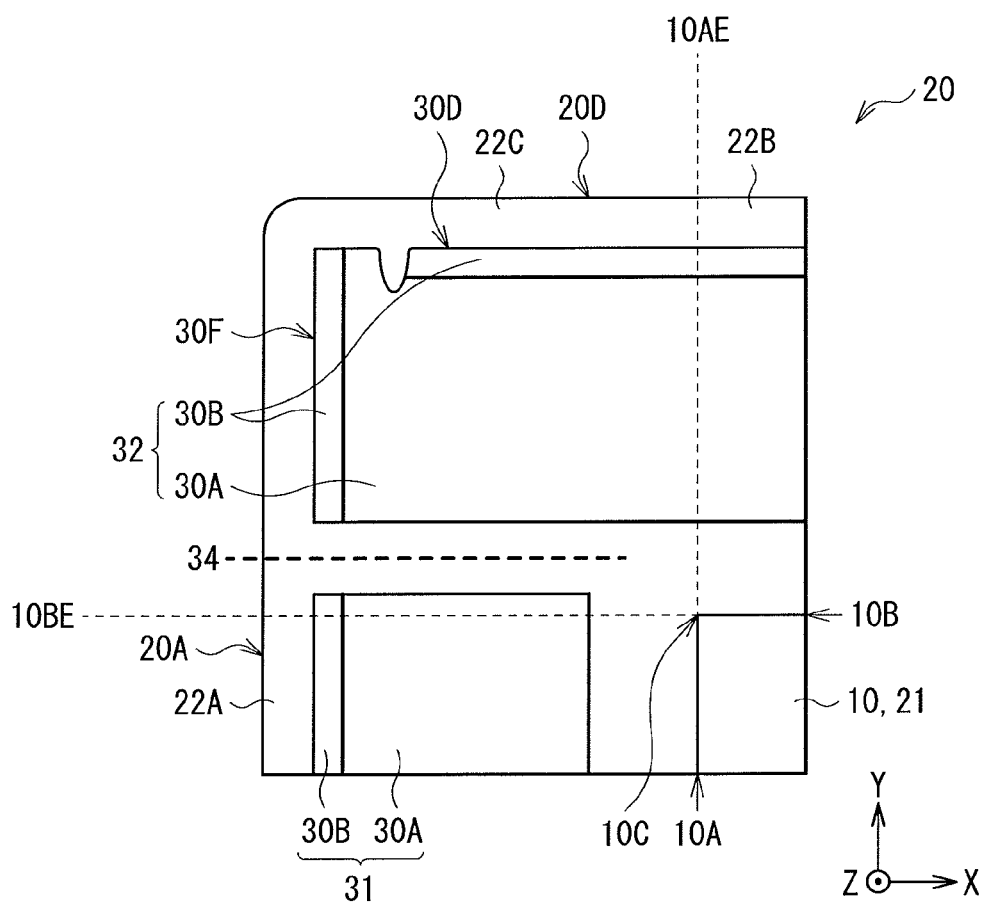
FIG. 6 is a plan view illustrating a part of a transparent board and an attaching member of a display device according to modification 1.

FIG. 6 illustrates a part of a transparent board 20 and an attaching member 30 of a display device 1 according to modification 1. In the modification 1, an outer-side raised portion 30B is provided on a side 30D, of the fixing portion 30A, located on the outer side in width direction, and on a side 30F which intersects with the side 30D.

Thus, in the modification 1, it becomes possible to provide the outer-side raised portion 30B on the entirety of outlines 20A to 20D of the transparent board 20 in order to enhance the effect of reducing the thickness of the transparent board 20 and the attaching member 30 while ensuring the strength thereof. Except for this point, the display device 1 of the modification 1 has the same configuration, function, and effect as those of the above mentioned first embodiment, and may be manufactured in a similar way to that of the above mentioned first embodiment.

Second Embodiment

Figure 7:
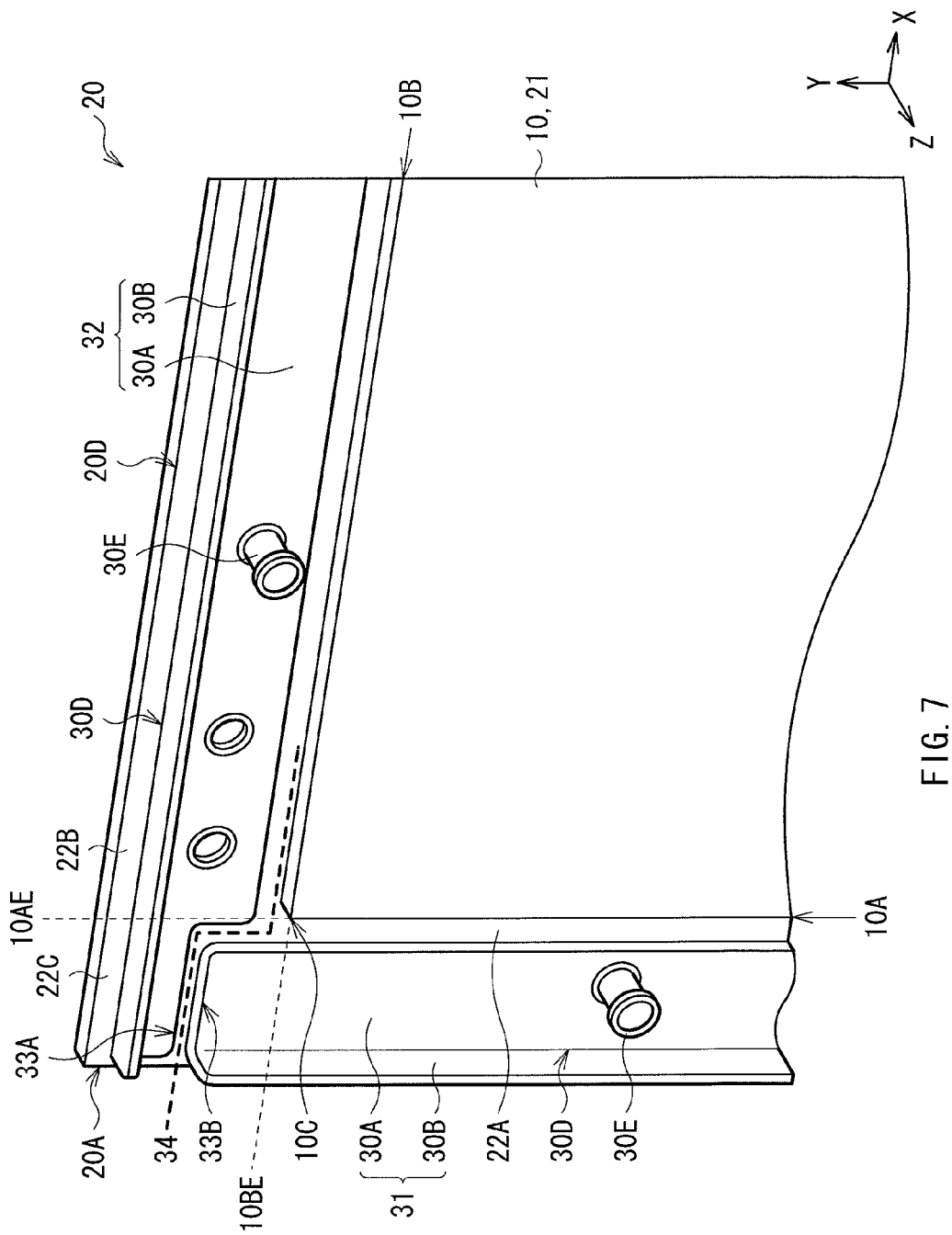
FIG. 7 is a perspective view illustrating a part of a transparent board and an attaching member of the display device according to a second embodiment of the present disclosure.
Figure 8:
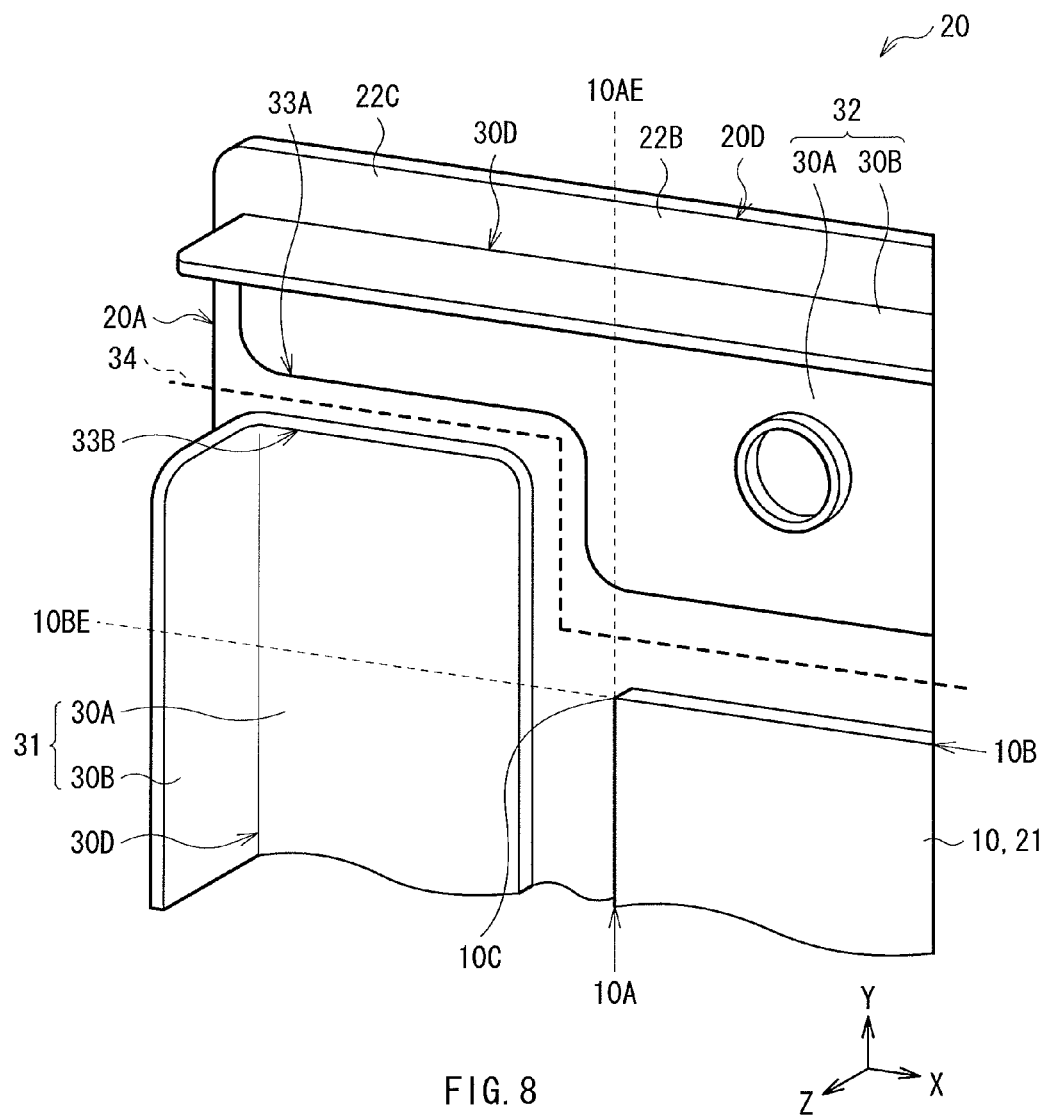
FIG. 8 is a perspective view illustrating a part of FIG. 7 in an enlarged manner.

FIG. 7 illustrates a part of a transparent board 20 and an attaching member 30 of a display device 1 according to a second embodiment of the present disclosure, and FIG. 8 illustrates a part of FIG. 7 in an enlarged manner. In the second embodiment, both of vertical attaching members 31 and horizontal attaching members 32 extend to corner regions 22C. A boundary line 34 between the vertical attaching member 31 and the horizontal attaching member 32 in the corner region 22C is bent at one or more locations (in FIG. 7 and FIG. 8, for example, two locations). Except for this point, the display device 1 of the second embodiment has the same configuration, function, and effect as those of the above mentioned first embodiment, and may be manufactured in a similar way to that of the above mentioned first embodiment.

Specifically, the horizontal attaching member 32 is provided with a cutout 33A, and the vertical attaching member 31 is provided with an embedding portion 33B which is pushed into the cutout 33A, so that the vertical attaching member 31 and the horizontal attaching member 32 are intricately formed. Therefore, the boundary line 34 is a bent line bent at one or more locations. In other words, at least one part of the boundary line 34 bypasses an extended line 10AE (or the periphery thereof) of a vertical side 10A of a display panel 10, or an extended line 10BE (or the periphery thereof) of a horizontal side 10B of the display panel 10. Thus, when an external force is applied to the transparent board 20 by, for example, pressing the transparent board 20 from the front face side, the external force is less likely to be directly exerted on a corner 10C of the display panel 10 in comparison to the case illustrated in FIG. 4 where the boundary line 34 is a straight line substantially corresponding to the extended line 10BE of the horizontal side 10B of the display panel 10. Consequently, external stress on the corner 10C of the display panel 10 is suppressed, and therefore the possibility that the corner 10C of the display panel 10 is peeled from the transparent board 20 is suppressed.

Modification 2

Figure 9:
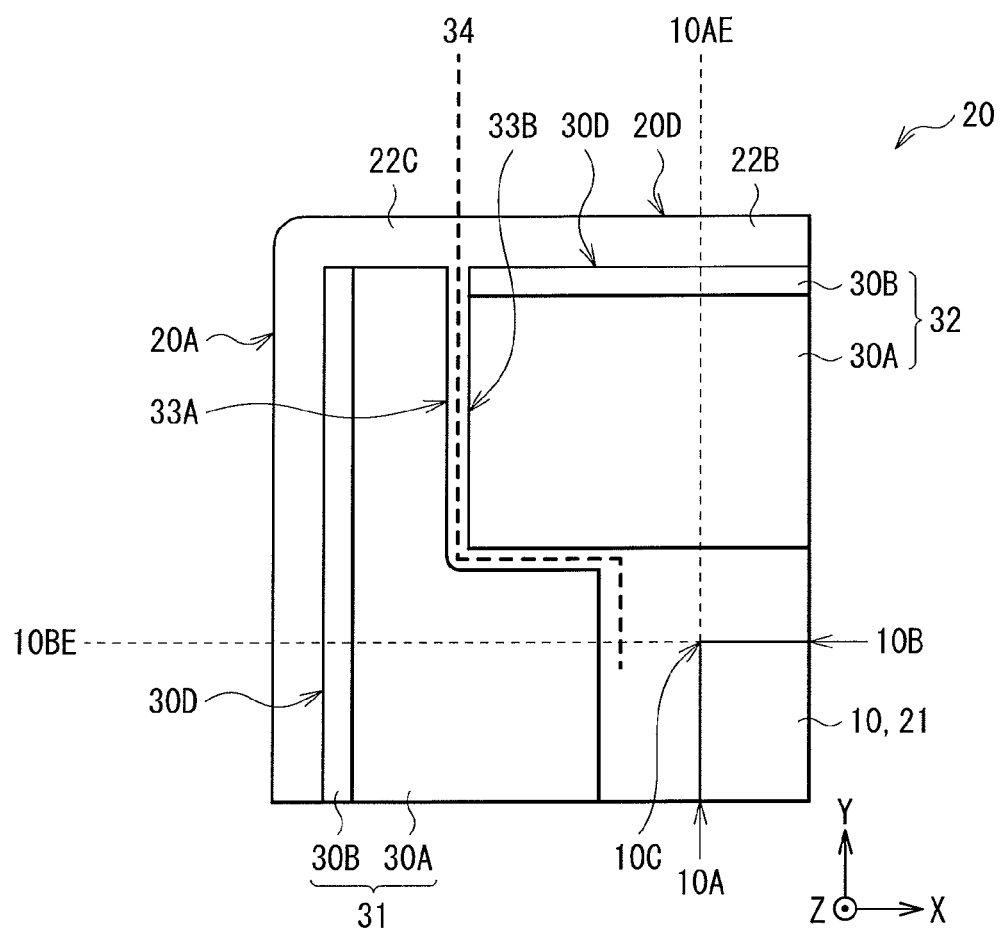
FIG. 9 is a plan view illustrating a part of a transparent board and an attaching member of the display device according to modification 2.

It is to be noted that, while, in the above mentioned second embodiment, the case where the horizontal attaching member 32 is provided with the cutout 33A, and the embedding portion 33B of the vertical attaching member 31 is pushed into the cutout 33A has been described, the vertical attaching member 31 may be provided with the cutout 33A, and the embedding portion 33B of the horizontal attaching member 31 may be pushed into the cutout 33A as illustrated in FIG. 9.

Modification 3

Figure 10:
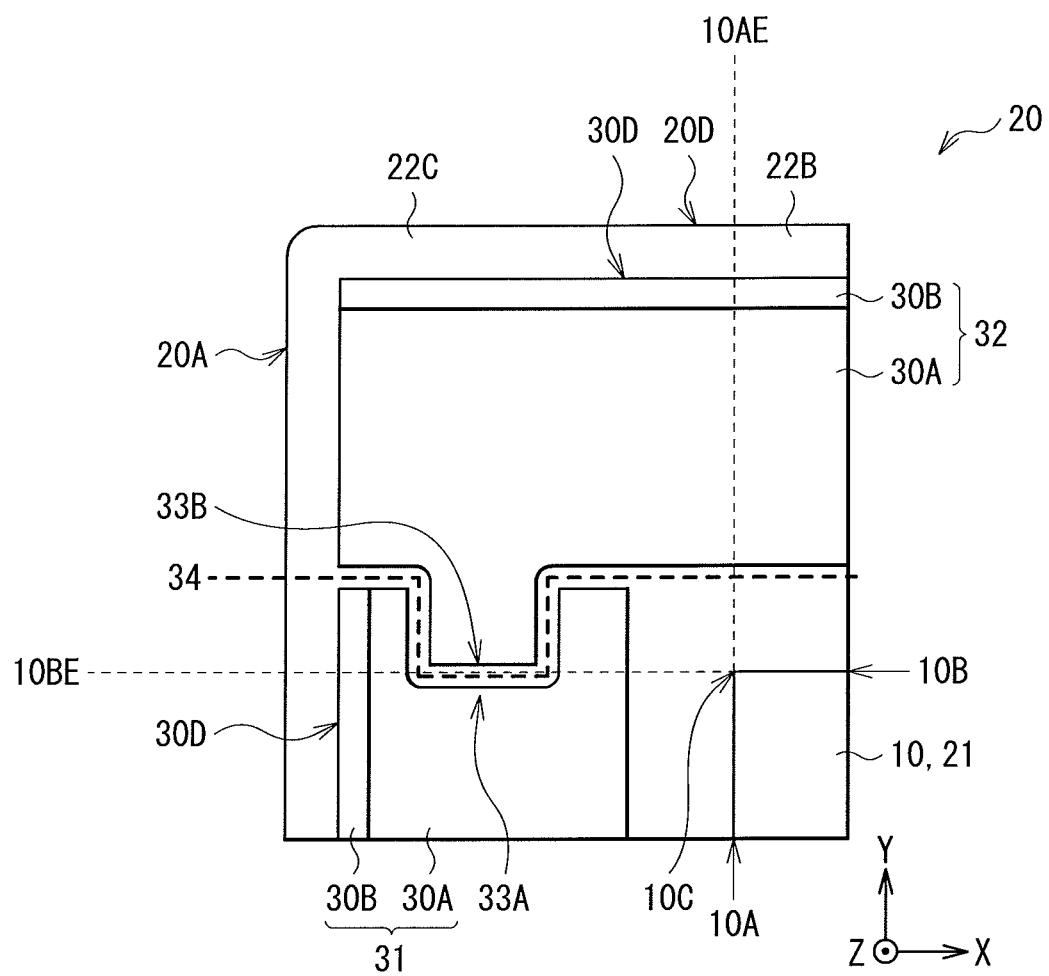
FIG. 10 is a plan view illustrating a part of a transparent board and an attaching member of a display device according to modification 3.

While in the above mentioned second embodiment, the case where the boundary line 34 is bent at, for example, two locations has been described, the number of the bending point of the boundary line 34 is not specifically limited, and the boundary line 34 may be bent at, for example, four locations as illustrated in FIG. 10. Further, although not shown in the figures, the shape of the boundary line 34 is not specifically limited, and may include curve line, or may be a wave shape with many bending points, for example.

Modifications 4 and 5

Figure 11:
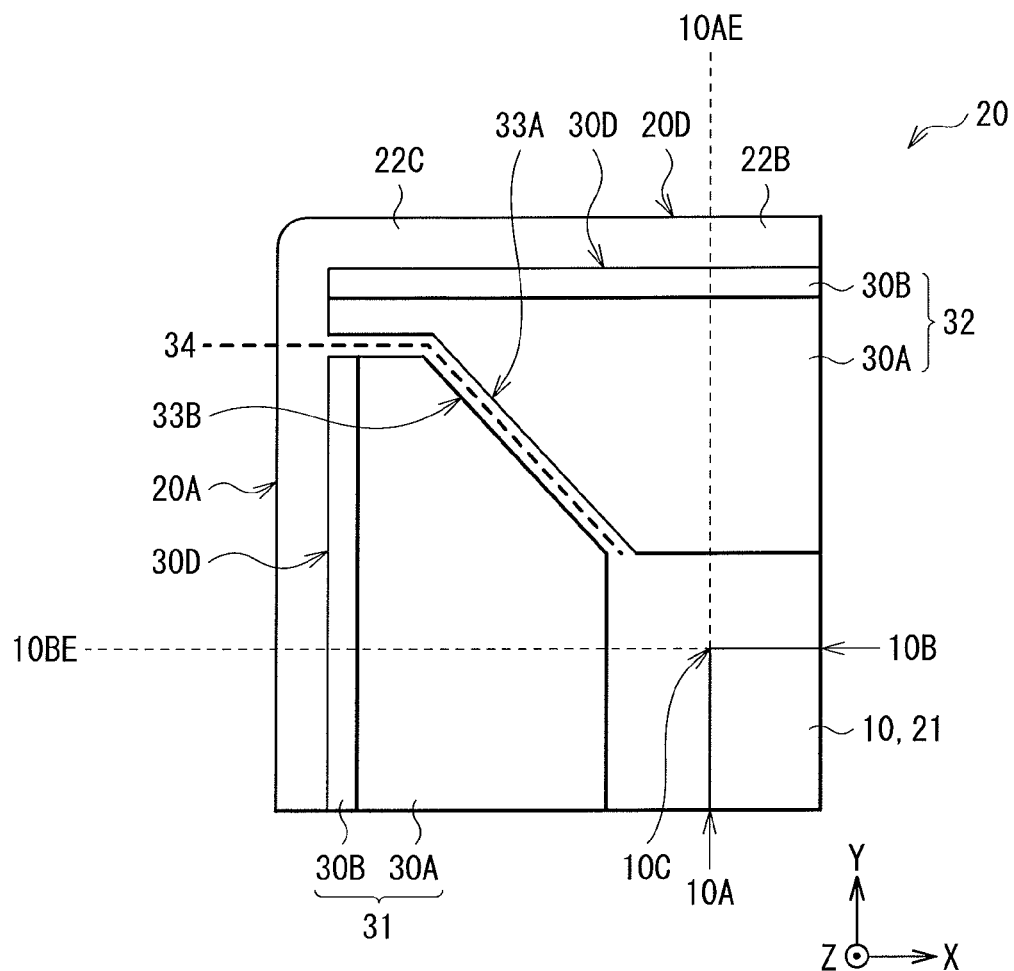
FIG. 11 is a plan view illustrating a part of a transparent board and an attaching member of a display device according to modification 4.
Figure 12:
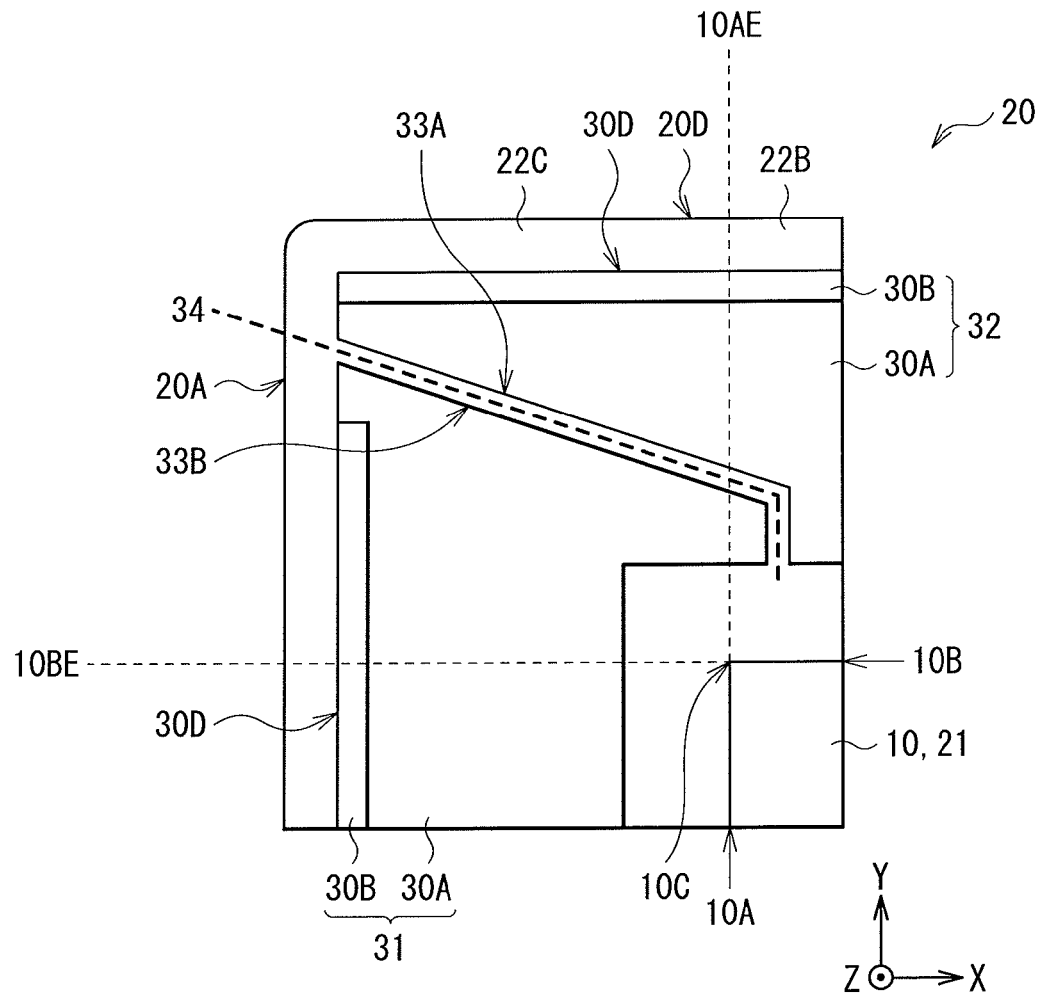
FIG. 12 is a plan view illustrating a part of a transparent board and an attaching member of a display device according to modification 5.

Further, as illustrated in FIG. 11 and FIG. 12, the boundary line 34 may be a bent line which is bent at one or more locations and a part of which is slanted relative to the vertical side 10A or the horizontal side 10B of the display panel 10.

Modifications 6 and 7

Figure 13:
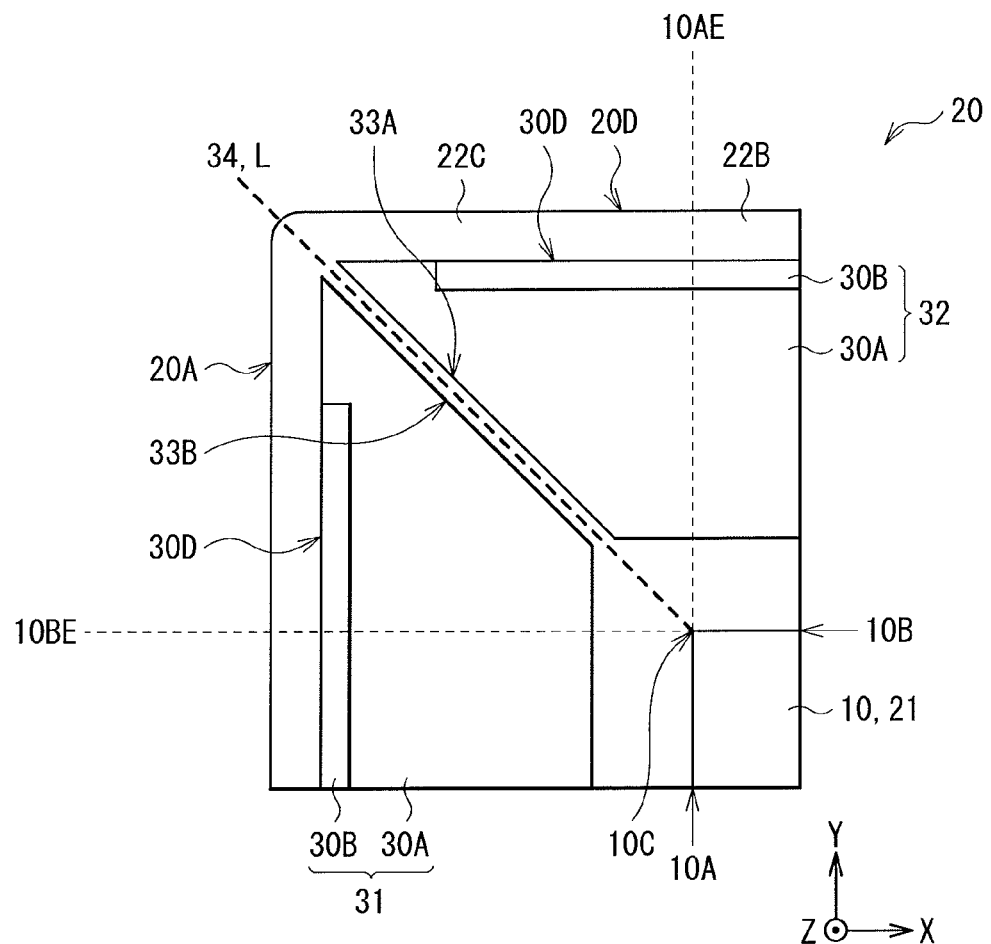
FIG. 13 is a plan view illustrating a part of a transparent board and an attaching member of a display device according to modification 6.
Figure 14:
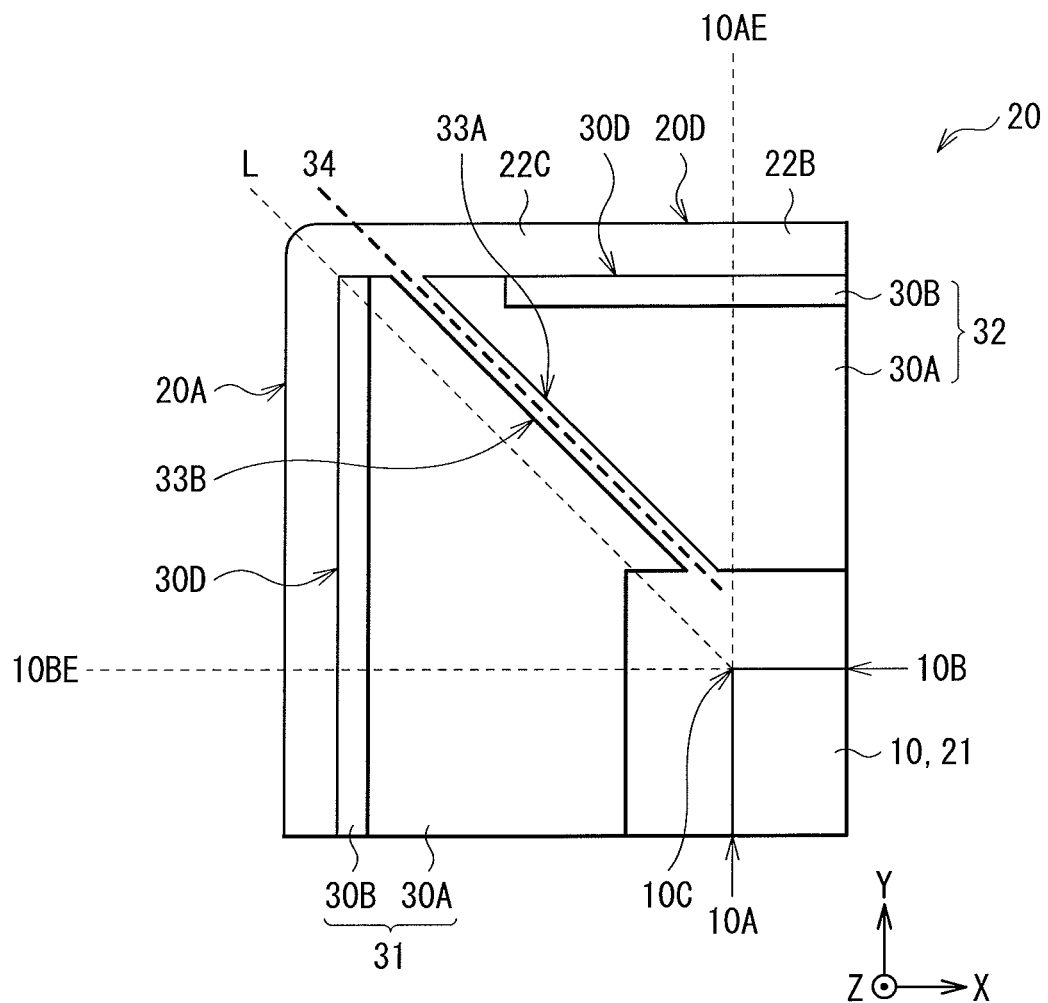
FIG. 14 is a plan view illustrating a part of a transparent board and an attaching member of a display device according to modification 7.

In addition, as illustrated in FIG. 13, the boundary line 34 may be a straight line which is not bent and is slanted, over the length thereof, relative to the vertical side 10A or the horizontal side 10B of the display panel 10. It is to be noted that, in this case, the boundary line 34 is preferably provided in such a manner as to bypass a straight line L connecting the corner 10C of the display panel 10 and a corner of the transparent board 20, as illustrated in FIG. 14. With this configuration, external force is less likely to be directly exerted on the corner 10C of the display panel 10 and therefore the possibility that the corner 10C of the display panel 10 is peeled from the transparent board 20 is suppressed.

Third Embodiment

Figure 15:
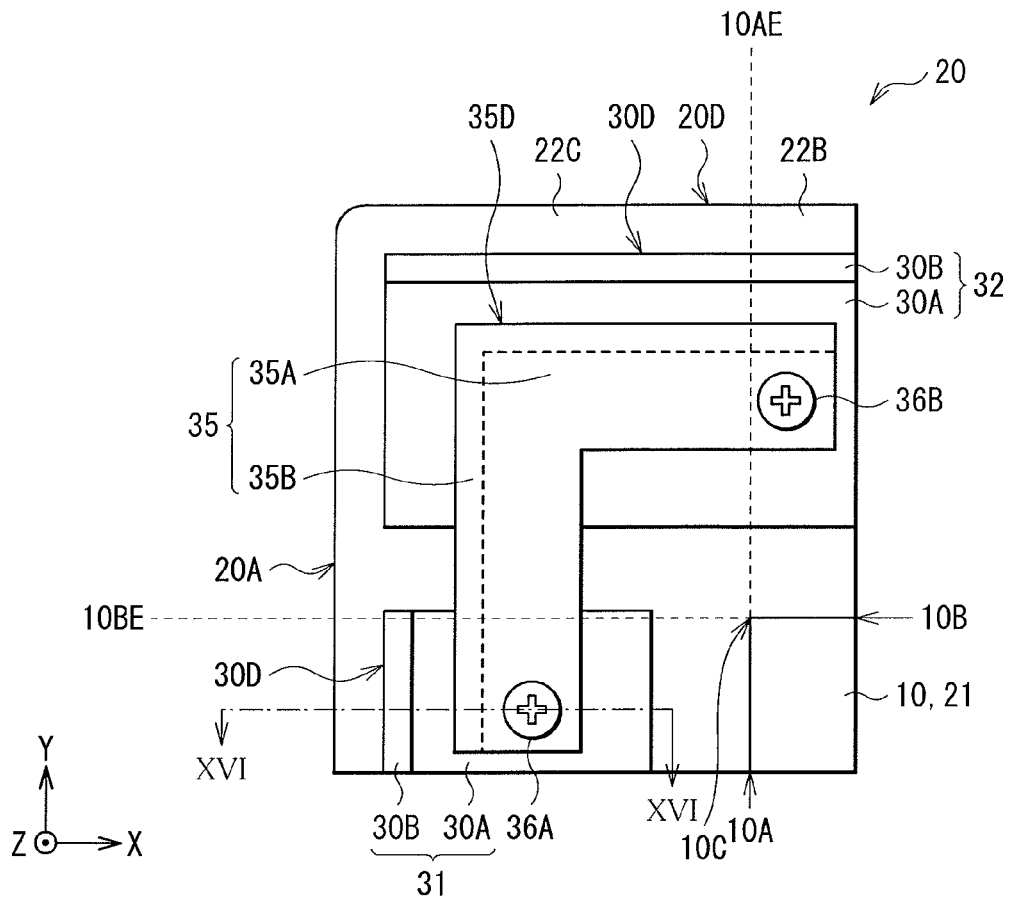
FIG. 15 is a plan view illustrating a part of a transparent board and an attaching member of a display device according to a third embodiment of the present disclosure.
Figure 16:
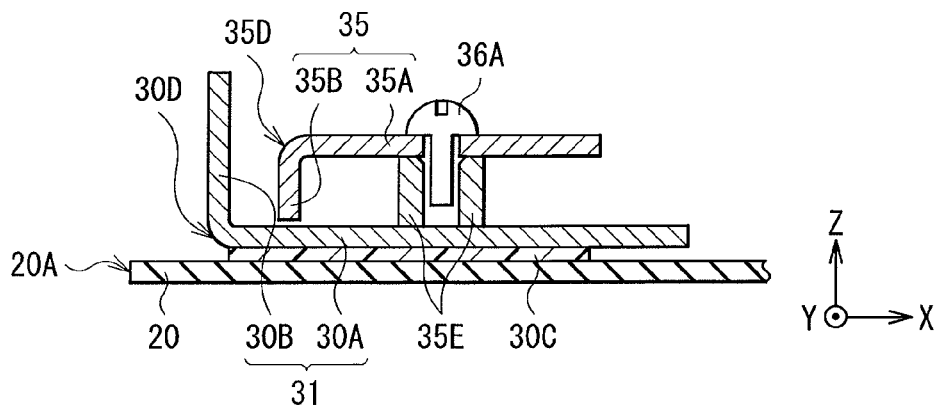
FIG. 16 is a sectional view taken along XVI-XVI line in FIG. 15.

FIG. 15 illustrates a part of a transparent board 20 and an attaching member 30 of a display device 1 according to a third embodiment of the present disclosure, and FIG. 16 illustrates a sectional configuration taken along XVI-XVI line in FIG. 15. In the third embodiment, a joint part 35, which is fixed to both a vertical attaching member 31 and a horizontal attaching member 32, is provided on respective corners of the transparent board 20 so as to reinforce corner regions 22C and further improve the strength thereof. Except for this point, the display device 1 of the third embodiment has the same configuration, function, and effect as those of the above mentioned first embodiment, and may be manufactured in a similar way to that of the above mentioned first embodiment.

The joint part 35 has an L-shaped planar shape bent 90° at the center thereof, and one end thereof is fixed to the vertical attaching member 31 with a screw 36A while the other end thereof is fixed to the horizontal attaching member 32 with a screw 36B. The joint part 35 has, similarly to the attaching member 30, a thickness of, for example, 0.8 mm, and is configured of a sheet-metal made of iron (Fe) or the like, and has, along the width direction, an L-shaped cross section made up of a fixing portion 35A and an outer-side raised portion 35B. The fixing portion 35A is fixed to the vertical attaching member 31 and the horizontal attaching member 32 with the screws 36A and 36B, respectively, as described above. The outer-side raised portion 35B is raised from a side, of the fixing portion 35A, adjacent to an outline 20A of the transparent board 20, that is, a side 35D located on the outer side in the width direction. Thus, the corner regions 22C may be reinforced to improve the strength thereof, and at the same time, an external force is less likely to be directly exerted on a corner 10C of the display panel 10, and therefore, the possibility that the corner 10C of the display panel 10 is peeled from the transparent board 20 may be suppressed.

The fixing portion 35A is provided with a stud 35E for attaching the screws 36A and 36B.

Figure 17:
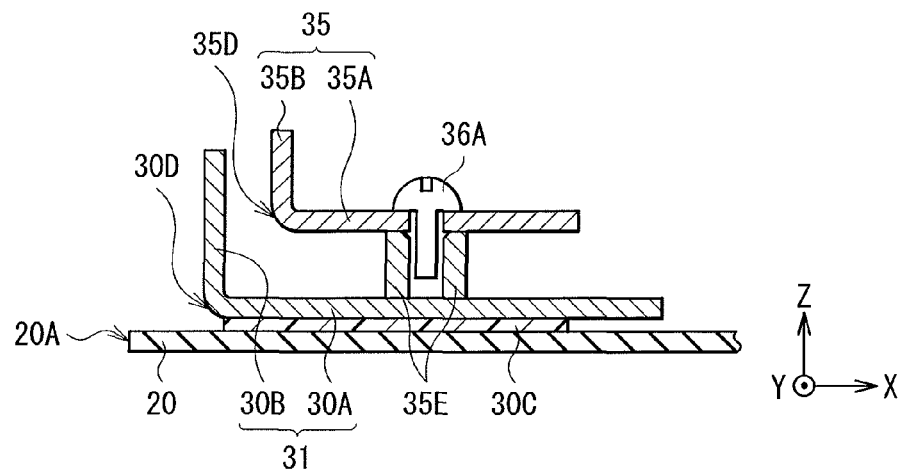
FIG. 17 is a sectional view illustrating a modification of the joint member shown in FIG. 16.

It is to be noted that, while FIG. 15 and FIG. 16 show the case where the outer-side raised portion 35B of the joint part 35 is directed downward (or, to the transparent board 20 side), the outer-side raised portion 35B of the joint part 35 may be directed upward (or, in a direction away from the transparent board 20) as illustrated in FIG. 17.

In addition, while in the above mentioned third embodiment, the case where each of the vertical attaching member 31 and the horizontal attaching member 32 has a straight-line shape with a certain width as those in the first embodiment has been described, the third embodiment may be, similarly to the second embodiment and modifications 2 to 7, applied to the case where the boundary line 34 is a bent line bent at one or more locations, and the case where at least a part of the boundary line 34 is slanted relative to a vertical side 10A or a horizontal side 10B of the display panel 10.

Modification 8

Figure 18:
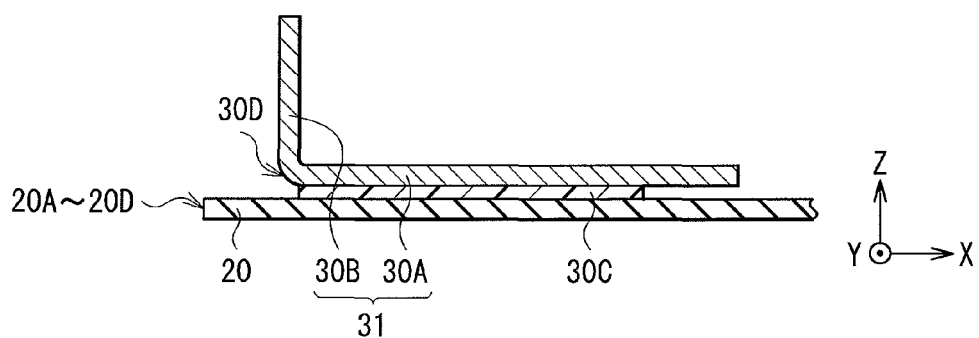
FIG. 18 is a sectional view of the transparent board and the attaching member of the first to third embodiments.
Figure 19:
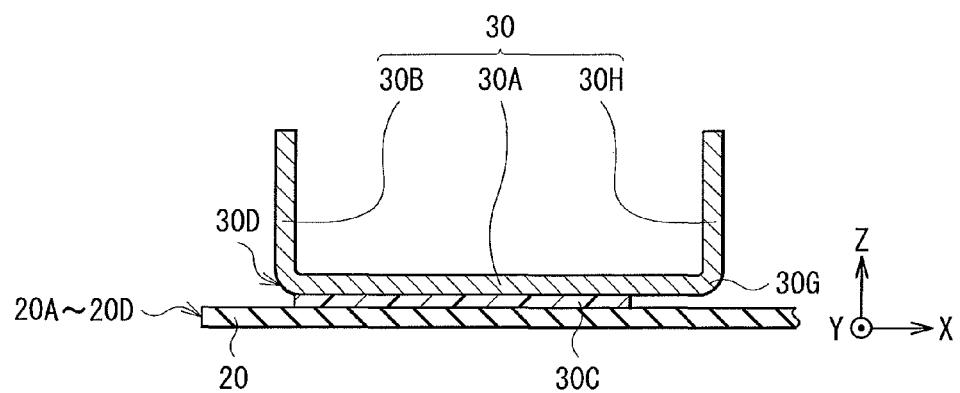
FIG. 19 is a sectional view of a transparent board and an attaching member according to modification 8.
Figure 20:
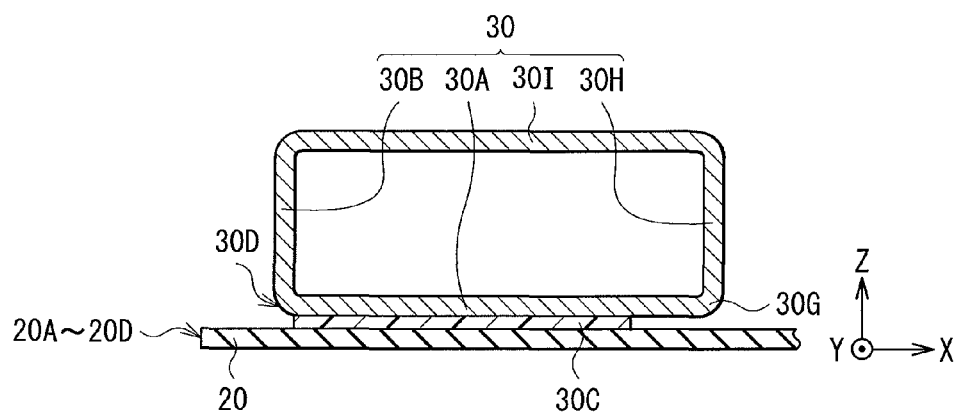
FIG. 20 is a sectional view of a transparent board and an attaching member according to modification 9.

In the above mentioned first to third embodiments, the case where the attaching member 30 has, along the width direction, an L-shaped cross section made up of the fixing portion 30A and the outer-side raised portion 30B, as illustrated in FIG. 18 has been described. However, as illustrated in FIG. 19, for example, the attaching member 30 may have an inner-side raised portion 30H raised from a side 30G located on an inner side in the width direction, so that the cross section along the width direction of the attaching member 30 may corresponds to three sides of a rectangular shape. In this way, the strength of the attaching member 30 may be further enhanced.

Modification 9

In addition, the attaching member 30 may have a ceiling portion 30I between an upper end of the outer-side raised portion 30B and an upper end of the inner-side raised portion 30H so as to have a rectangular cross section along the width direction. In this way, the strength of the attaching member 30 may be enhanced still further.

Modification 10

Figure 21:
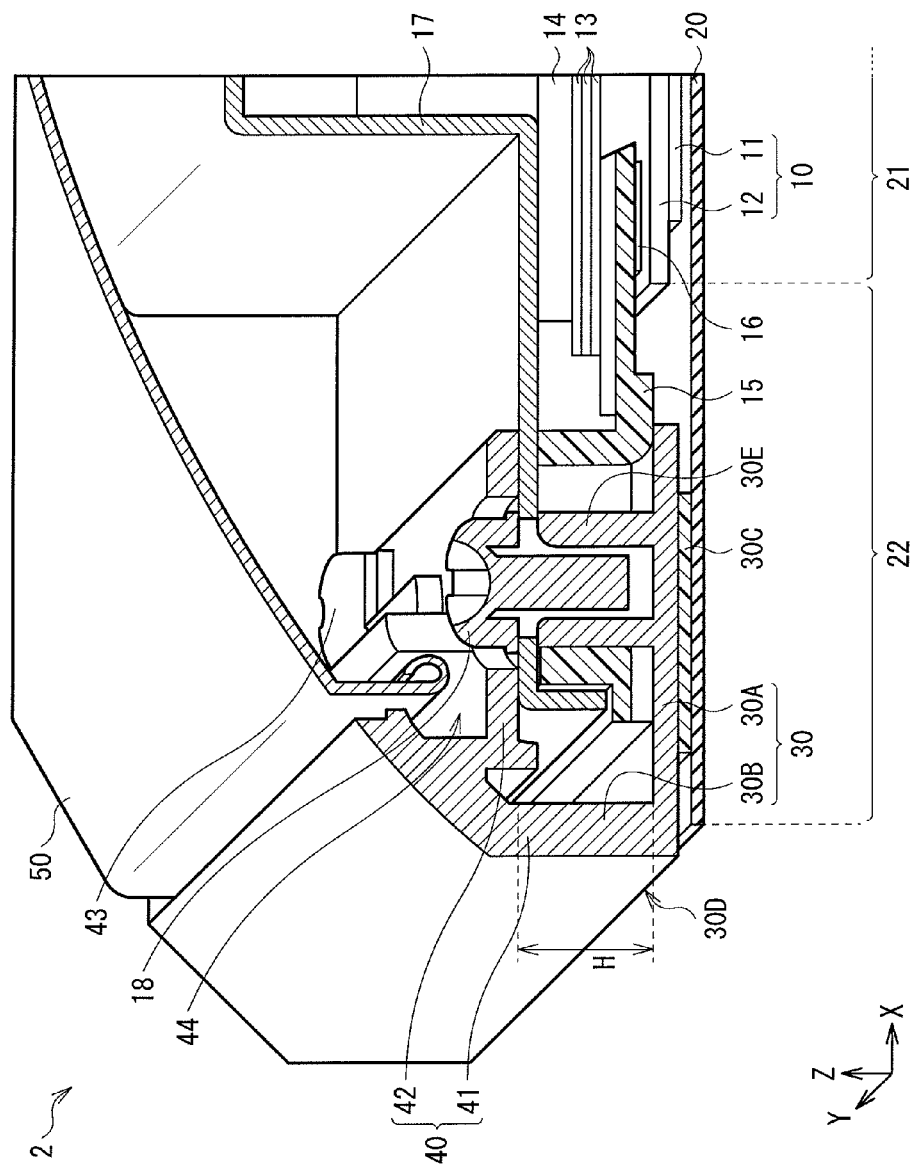
FIG. 21 is a partially cut-out perspective view illustrating an internal constitution of a main body portion of a display device according to modification 10.

In addition, while in the above mentioned first to third embodiments, the case where the exterior member 40 is provided separately from the attaching member 30 has been described, the outer-side raised portion 30B of the attaching member 30 may also serve as the side face portion 41 of the exterior member 40 as illustrated in FIG. 21, for example. Specifically, the attaching member 30 and the exterior member 40 may be integrally formed. Thus, the number of components may be reduced while reducing the cost.

Modifications 11 to 13

Figure 22:
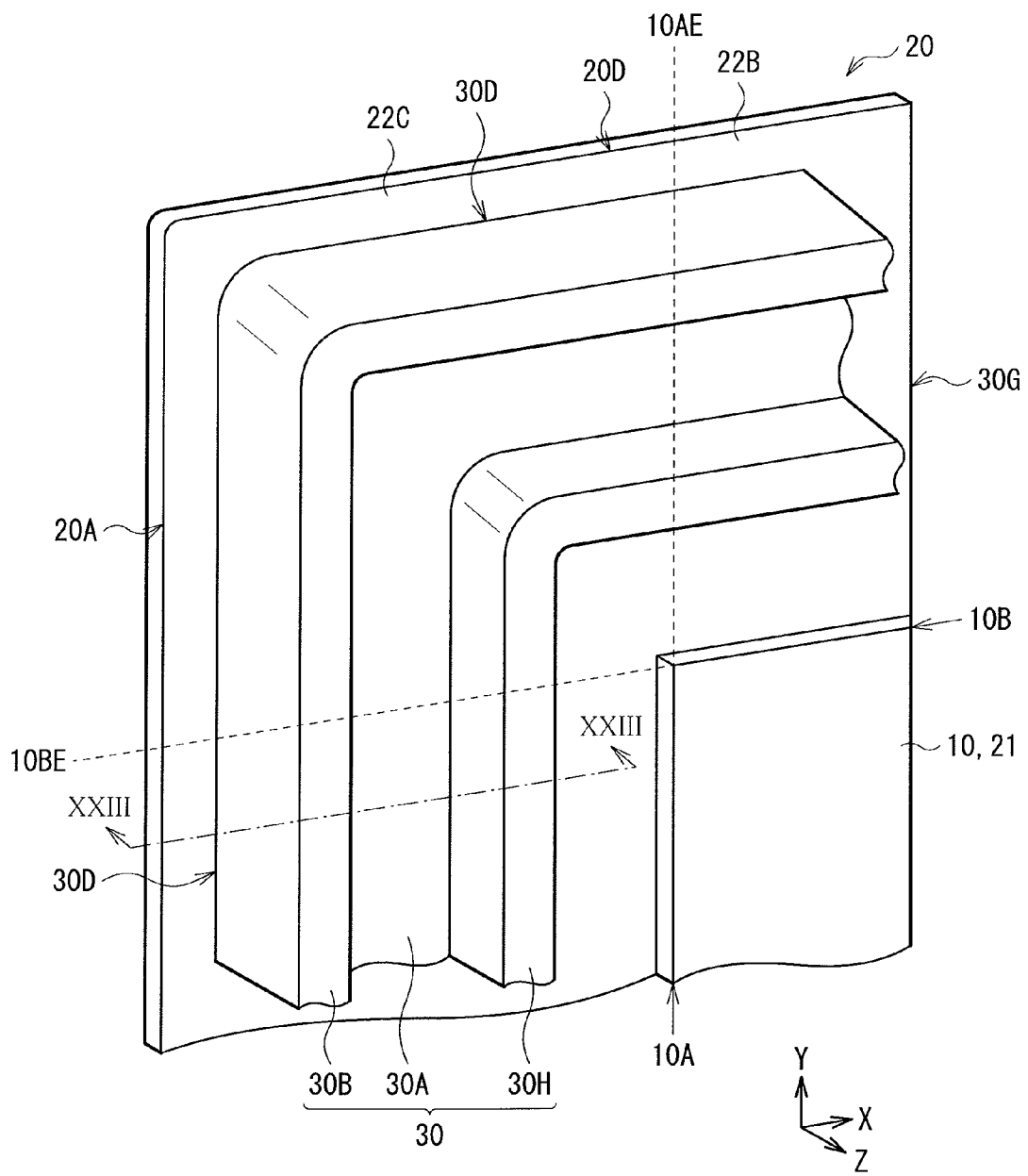
FIG. 22 is a perspective view illustrating a part of a transparent board and an attaching member according to modification 11.
Figure 23:
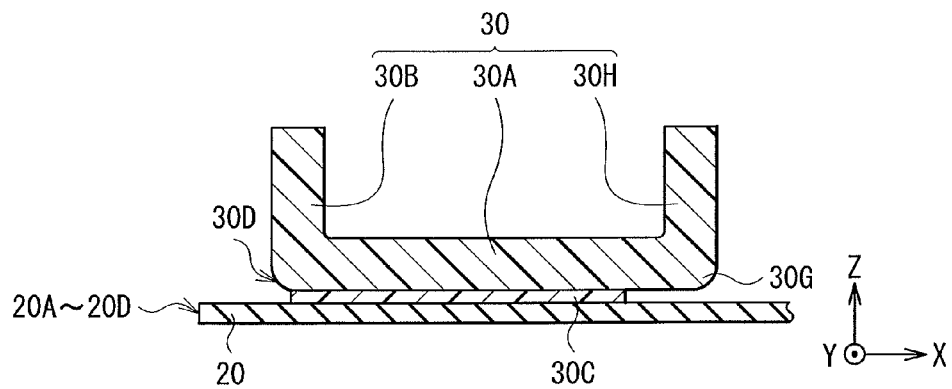
FIG. 23 is a sectional view taken along XXIII-XXIII line in FIG. 22.

Further, while in the above mentioned first to third embodiments, the case where the attaching member 30 has the vertical attaching member 31 and the horizontal attaching member 32 has been described, the attaching member 30 may be integrally configured over the entirety of the outer frame region 22 as illustrated in FIG. 22 and FIG. 23, for example. It is to be noted that, while in FIG. 22 and FIG. 23 show the case where the attaching member 30 is made of a resin and is integrally configured over the entirety of the outer frame region 22, the attaching member 30 may be configured of a metal plate and may be integrally configured over the entirety of the outer frame region 22. When a resin is used, the cost may be reduced, and when a metal plate is used, the thickness may be reduced.

Figure 24:
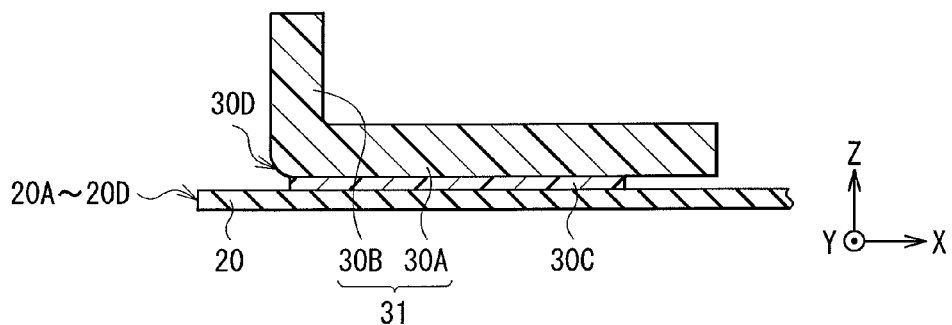
FIG. 24 is a sectional view of a transparent board and an attaching member according to modification 12.
Figure 25:
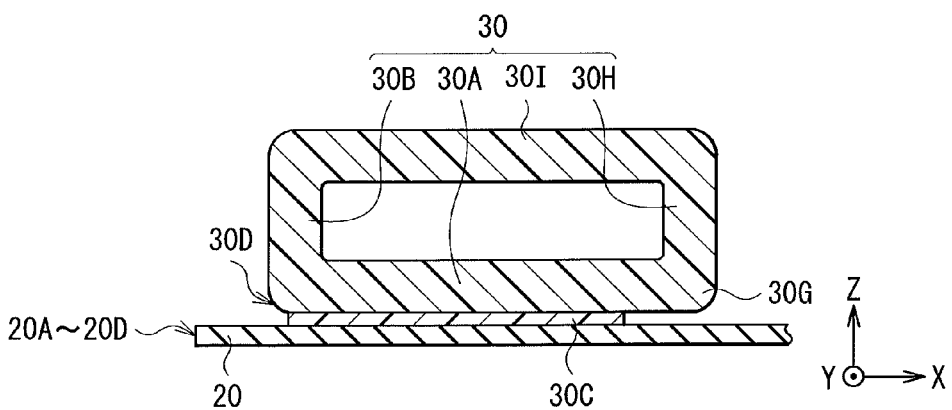
FIG. 25 is a sectional view of a transparent board and an attaching member according to modification 13.

It is to be noted that, in FIG. 22 and FIG. 23, the case where the cross section along the width direction of the attaching member 30 corresponds to three sides of a rectangular shape has been described, the attaching member 30 may have an L-shaped cross section along the width direction as illustrated in FIG. 24, or may have a hollow rectanglar shape along the width direction as illustrated in FIG. 25.

While the present disclosure has been described above based on the embodiments, the present disclosure is not limited to the above mentioned embodiments, and various modifications may be made. For example, while in the above mentioned embodiments, the case where the entirety of the display panel 10 and the transparent board 20 are bonded together by the bonding layer (not shown) has been described, the present disclosure may be applied to the case where the bonding layer (not shown) is not provided and the space between the display panel 10 and the transparent board 20 is filled with air (air gap).

The present technology may be configured as follows:

(1)
A display device including:
a display panel;
a transparent board having
a panel installation region in which the display panel is provided, and
an outer frame region surrounding the panel installation region; and
an attaching member having
a fixing portion bonded to the transparent board in the outer frame region, and
an outer-side raised portion raised from a side of the fixing portion, the side being adjacent to an outline of the transparent board.

(2)
The display device according to (1), wherein
the outer frame region includes:
a longitudinal outer frame region surrounded by a vertical side of the display panel, an extended line of a horizontal side of the display panel, and the outline of the transparent board;
a horizontal outer frame region surrounded by the horizontal side of the display panel, an extended line of the vertical side of the display panel, and the outline of the transparent board; and
a corner region surrounded by the extended line of the vertical side of the display panel, the extended line of the horizontal side of the display panel, and the outline of the transparent board, and
the attaching member extends to the corner region beyond the longitudinal outer frame region or the horizontal outer frame region.

(3)
The display device according to (2) wherein
the attaching member includes:
a vertical attaching member provided in the longitudinal outer frame region or both of the longitudinal outer frame region and the corner region; and
a horizontal attaching member provided in the horizontal outer frame region or both of the horizontal outer frame region and the corner region, and
one or both of the vertical attaching member and the horizontal attaching member extend to the corner region.

(4)
The display device according to (3), wherein
both of the vertical attaching member and the horizontal attaching member extend to the corner region, and
a boundary line between the vertical attaching member and the horizontal attaching member in the corner region is bent at one or more locations.

(5)
The display device according to (3) or (4), wherein
both of the vertical attaching member and the horizontal attaching member extend to the corner region, and
at least a part of the boundary line between the vertical attaching member and the horizontal attaching member in the corner region is slanted relative to the vertical side or the horizontal side of the display panel.

(6)
The display device according to one of (2) to (5), further comprising
a joint part which is provided on a corner of the transparent board and fixed to both of the vertical attaching member and the horizontal attaching member.

(7)
The display device according to one of (1) to (6), wherein
the outer-side raised portion of the attaching member also serves as an exterior member covering a side face of the display panel.

(8)
The display device according to one of (1) to (7), wherein
the attaching member has an inner-side raised portion raised from a side of the fixing portion, the side being located on an inner side in a width direction.

(9)
The display device according to (8), wherein
the attaching member has a ceiling portion provided between an upper end of the outer-side raised portion and an upper end of the inner-side raised portion.

(10)
The display device according to one of (1), (2), (8) and (9), wherein
the attaching member is integrally configured over the entirety of the outer frame region.

It should be understood by those skilled in the art that various modifications, combinations, sub-combinations and alterations may occur depending on design requirements and other factors insofar as they are within the scope of the appended claims or the equivalents thereof.

What is claimed is:
1. A display device comprising:
a display panel;
a transparent board having
  a panel installation region in which said display panel is provided, and
  an outer frame region surrounding said panel installation region;
an attaching member having
  a fixing portion bonded to said outer frame region of said transparent board, and
  an outer-side raised portion raised from a side of said fixing portion, said side being adjacent to an outline of said transparent board; and
an exterior member, covering a side face of said display panel, having
  a side face portion parallel to said outer-side raised portion of said attaching member, and
  a top face portion fixed to said attaching member and perpendicular to said side face portion,
wherein said attaching member and said exterior member are integrally formed.

2. The display device according to claim 1, wherein
said attaching member has a hollow rectangular shape cross section or an L-shaped cross section along a width direction.

3. The display device according to claim 1, wherein
said outer frame region comprises:
  a longitudinal outer frame region surrounded by a vertical side of said display panel, an extended line of a horizontal side of said display panel, and said outline of said transparent board,
  a horizontal outer frame region surrounded by said horizontal side of said display panel, an extended line of said vertical side of said display panel, and said outline of said transparent board, and
  a corner region surrounded by said extended line of said vertical side of said display panel, said extended line of said horizontal side of said display panel, and said outline of said transparent board,
wherein said attaching member extends to said corner region beyond said longitudinal outer frame region or said horizontal outer frame region.

4. The display device according to claim 3, wherein
said attaching member comprises:
  a vertical attaching member provided in said longitudinal outer frame region or both of said longitudinal outer frame region and said corner region, and
  a horizontal attaching member provided in said horizontal outer frame region or both of said horizontal outer frame region and said corner region, and one or both of said vertical attaching member and said horizontal attaching member extend to said corner region.

5. The display device according to claim 4, wherein
both of said vertical attaching member and said horizontal attaching member extend to said corner region, and
a boundary line between said vertical attaching member and said horizontal attaching member in said corner region is bent at one or more locations.

6. The display device according to claim 4, wherein
both of said vertical attaching member and said horizontal attaching member extend to said corner region, and
at least a part of a boundary line between said vertical attaching member and said horizontal attaching member in said corner region is slanted relative to said vertical side or said horizontal side of said display panel.

7. The display device according to claim 1, wherein
said attaching member comprises:
  a vertical attaching member provided in a longitudinal outer frame region of said outer frame region, and
  a horizontal attaching member provided in a horizontal outer frame region of said outer frame region.

8. The display device according to claim 7, wherein
a part of a boundary line, between said vertical attaching member and said horizontal attaching member, is bent at one or more locations and another part of said boundary line is slanted relative to a vertical side or a horizontal side of said display panel.

9. The display device according to claim 7, further comprising
a joint part provided on a corner of said transparent board and fixed to both of said vertical attaching member and said horizontal attaching member.

10. The display device according to claim 7,
wherein said horizontal attaching member is provided with a cutout and said vertical attaching member is provided with an embedding portion which is pushed into said cutout.

11. The display device according to claim 1, wherein said attaching member has an inner-side raised portion raised from a side of said fixing portion, said side being located on an inner side in a width direction.

12. The display device according to claim 11, wherein said attaching member has a ceiling portion provided between an upper end of said outer-side raised portion and an upper end of said inner-side raised portion.

13. The display device according to claim 1, wherein said attaching member is integrally configured over the entirety of said outer frame region.

14. The display device according to claim 1, wherein said display panel is bonded to said transparent board by a transparent bonding layer made of an ultraviolet curable resin.

15. The display device according to claim 1, further comprising
an optical sheet;
a light guide plate; and
a backlight disposed on a backside of said display panel, wherein said optical sheet and said light guide plate are held by a middle chassis fixed to said display panel.

16. The display device according to claim 15, further comprising
a back chassis covering said display panel, said optical sheet, said light guide plate, said backlight, and said middle chassis, wherein said back chassis is made of one of: steel, aluminum (Al) or magnesium (Mg).

17. The display device according to claim 1, wherein said fixing portion is bonded to said outer frame region of said transparent board by a bonding layer such as a double-face stick tape.

18. The display device according to claim 1, wherein said attaching member is not extended to a corner of said transparent board.

19. The display device according to claim 18, wherein said outer-side raised portion of said attaching member serves as an exterior member covering a side face of said display panel.

20. A display device comprising:
a display panel;
a transparent board having
a panel installation region in which said display panel is provided, and
an outer frame region surrounding said panel installation region; and
an attaching member having
a fixing portion bonded to said outer frame region of said transparent board, and
an outer-side raised portion raised from a side of said fixing portion, said side being adjacent to an outline of said transparent board,
wherein said attaching member comprises:
a vertical attaching member provided in a longitudinal outer frame region of said outer frame region, and
a horizontal attaching member provided in a horizontal outer frame region of said outer frame region,
wherein said horizontal attaching member is provided with a cutout and said vertical attaching member is provided with an embedding portion which is pushed into said cutout.

* * * * *